Dec. 3, 1968 T. E. KASMER ET AL 3,414,786
STEPPING MOTOR SERVO
Filed Oct. 22, 1965 12 Sheets-Sheet 1

INVENTORS
THOMAS E. KASMER
WILLIAM C. OGDEN

BY *Donald R. Campbell*
ATTORNEY

STEP 3

STEP 2

STEP 1

STEP 0

Dec. 3, 1968  T. E. KASMER ET AL  3,414,786

STEPPING MOTOR SERVO

Filed Oct. 22, 1965  12 Sheets-Sheet 3

Dec. 3, 1968 T. E. KASMER ET AL 3,414,786
STEPPING MOTOR SERVO
Filed Oct. 22, 1965 12 Sheets-Sheet 5

3,414,786
STEPPING MOTOR SERVO
Thomas E. Kasmer, Johnson City, and William C. Ogden, Endwell, N.Y., assignors to International Business Machines Corporation, Armonk, N.Y., a corporation of New York
Filed Oct. 22, 1965, Ser. No. 500,686
14 Claims. (Cl. 318—18)

This invention relates to stepping motor servos, and more particularly to digitally controlled stepping motor servos incorporated for instance into a positioning table.

A conventional stepping motor servo system positions with the use of externally generated pulses, one pulse for one step of movement. This method can lead to difficulty if the inertial load is such that the motor cannot follow the fixed pulse rate, since step pulses can be lost and the motor gets out of step.

An object of the invention is to provide a generally improved and more satisfactory stepping motor servo capable of more rapid and accurate positioning than has heretofore been possible in a stepping motor servo.

Another object is the provision of a new and improved stepping motor servo which utilizes self-generated commands, with the exception of a starting command, that are synchronized with the rotation of the motor so that the motor cannot lose commands and get out of step.

Yet another object is to provide a stepping motor servo of the foregoing type capable of driving any inertial load while staying in step, with acceleration-deceleration characteristics similar to those of a D.C. servo-wound motor.

A further object of the invention is to provide a new and improved computer controlled digital stepping motor servo which, rather than employing a conventional feedback of actual position to effect an incremental move, rotates blindly in the initial indicated direction until stopping data produced in the computer brings the motor to a stop by virtue of its incremental characteristics.

A still further object is the provision of a new and improved positioning table employing stepping motor servos which achieves fast and accurate positioning.

Another object is to provide an improved two-axis linearly moving positioning table operated by stepping motor servos wherein the actual position of the table is determined from the angular position of the servo motors without the need of data on the linear positions of the table members.

In accordance with the invention, an encoder disc is preferably fixed to one end of the rotating member (rotor or stator) of the stepping motor and has circularly arranged indicia corresponding to the number of steps of the stepping motor (a running track) and other indicia which give a unique digital representation of the actual angular position of the rotating member for each of its steps. As each of the running track indicia passes a fixed sensor, a command pulse is generated which rotates the magnetic field of the fixed member of the stepping motor to move the member one step. Between indicia the motor is locked on step. In a linear moving positioning table, means such as a gear and rack are utilized to convert rotary motion into translatory motion.

To start the motor, a starting pulse (exclusive of the encoder) is inserted from a control unit such as a computer. Thereafter the motor generates its own command pulses and the motor accelerates since the field of the fixed motor member leads that of the rotating member. In the control unit is a subtractor having as one term the desired position and as the other term the actual position from the encoder disc, both in digital form. At start, the sign of the difference is obtained and this determines the direction in which the motor turns. As the motor rotates, the number corresponding to the actual position changes continuously. At a predetermined number of steps before the stop dependent on the initial difference or length of move, at least one command pulse is skipped or subtracted, causing the motor to decelerate. At the final step the difference is zero. One step before the desired position is reached, a friction brake preferably acts on the moving member to dampen out oscillations.

The foregoing and other objects, features and advantages of the invention will be apparent from the following more particular description of a preferred embodiment of the invention, as illustrated in the accompanying drawings wherein.

Figure 3B:
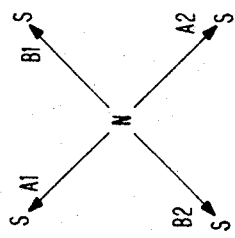
Figure 3A:
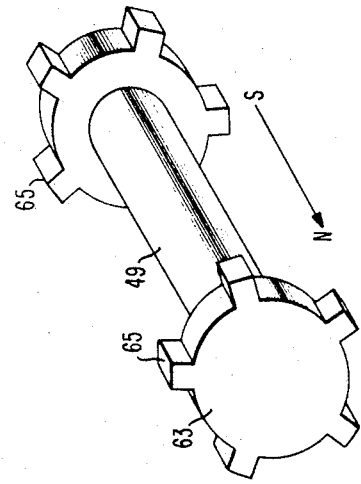
Figure 3C:
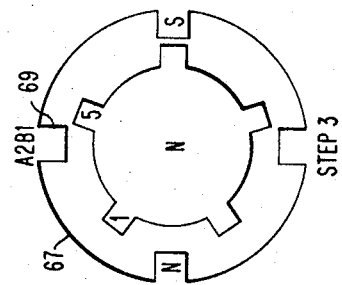
Figure 3C:
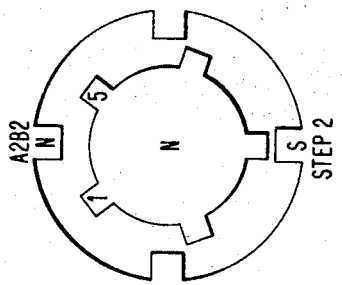
Figure 3C:
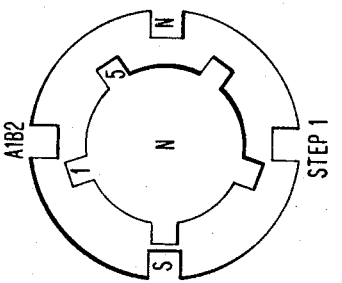
Figure 3C:
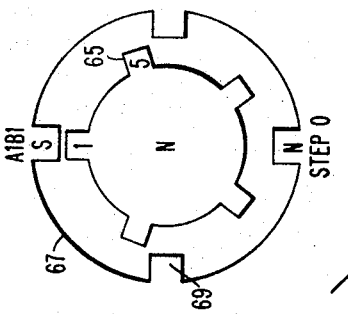
Figure 4:
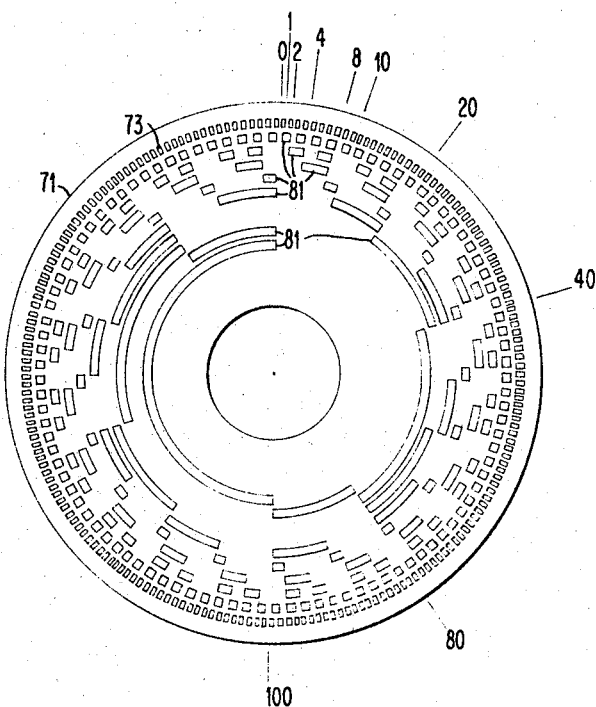
Figure 5:
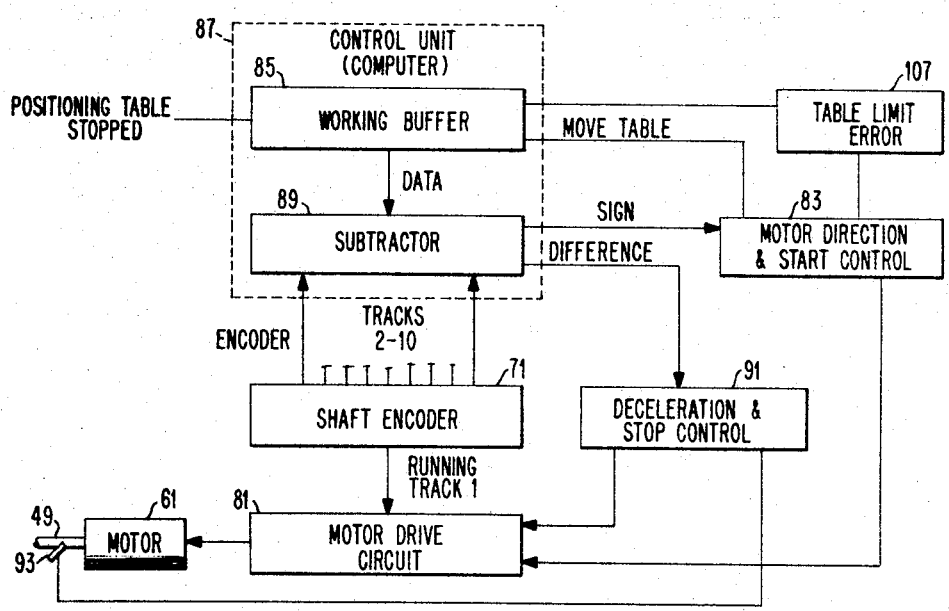
Figure 6:
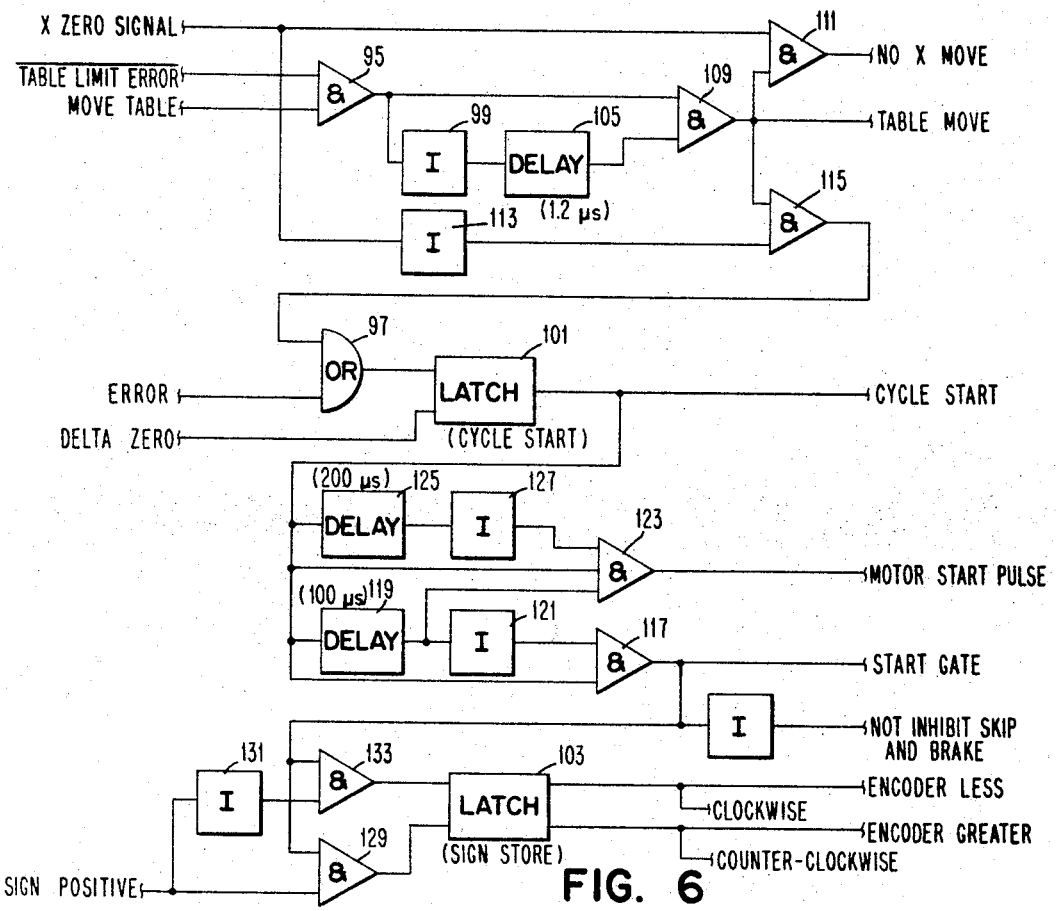
Figure 7:
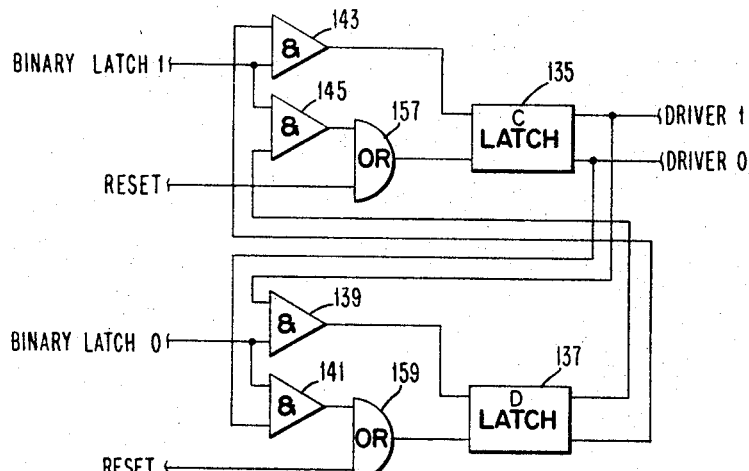
Figure 8:
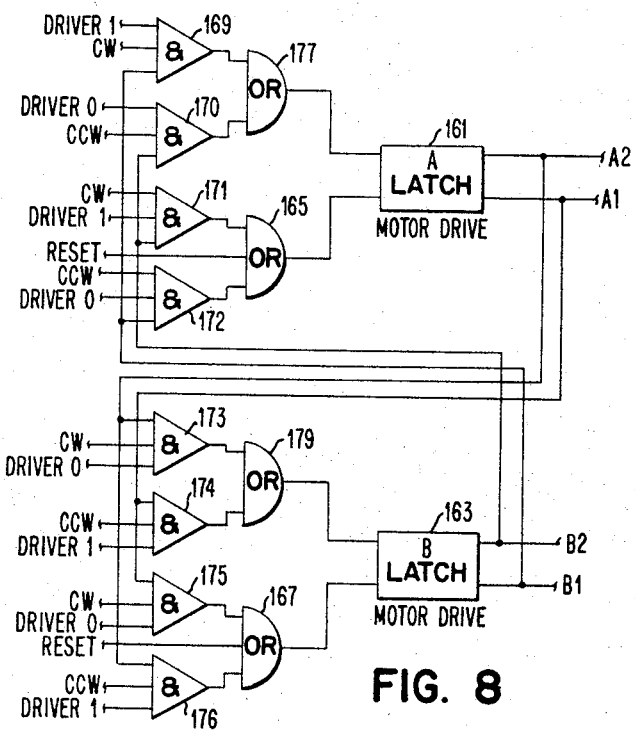
Figure 9:
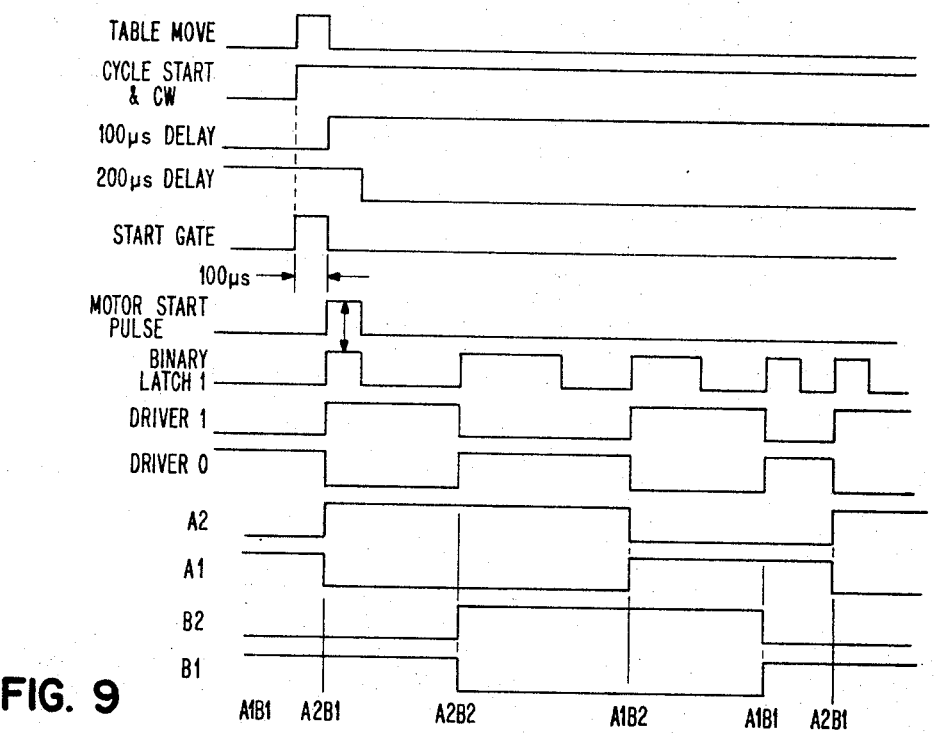
Figure 10:
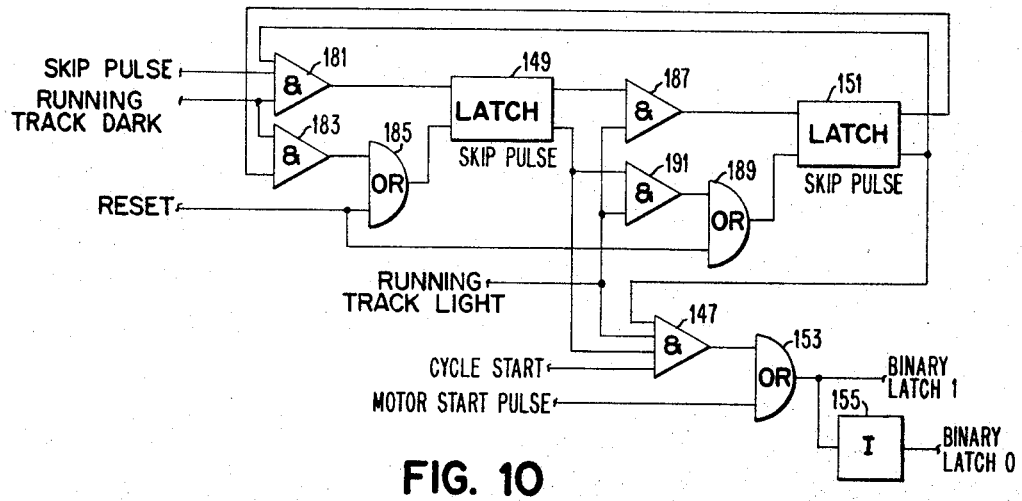
Figure 11:
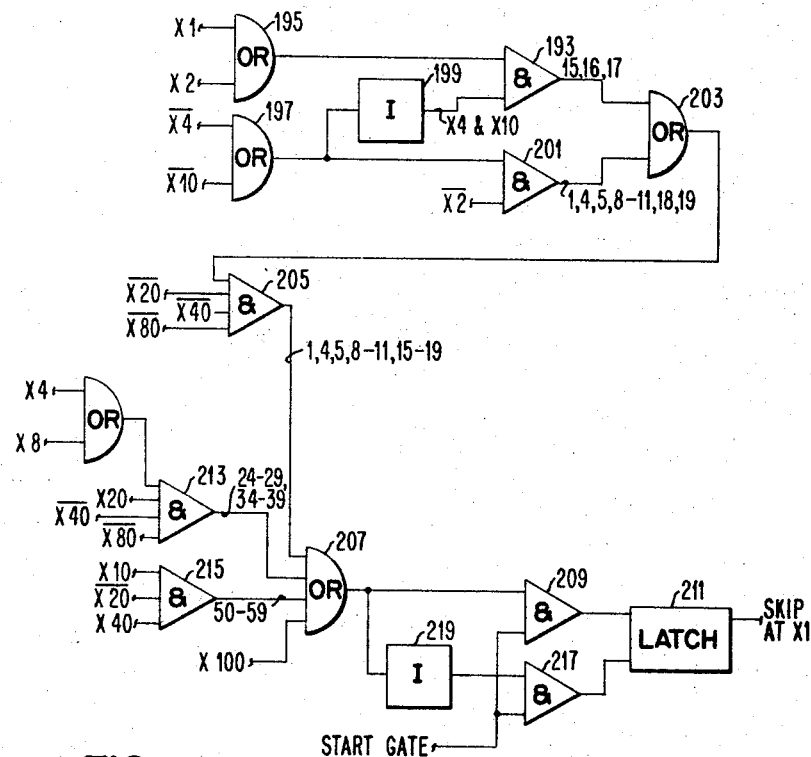
Figure 12:
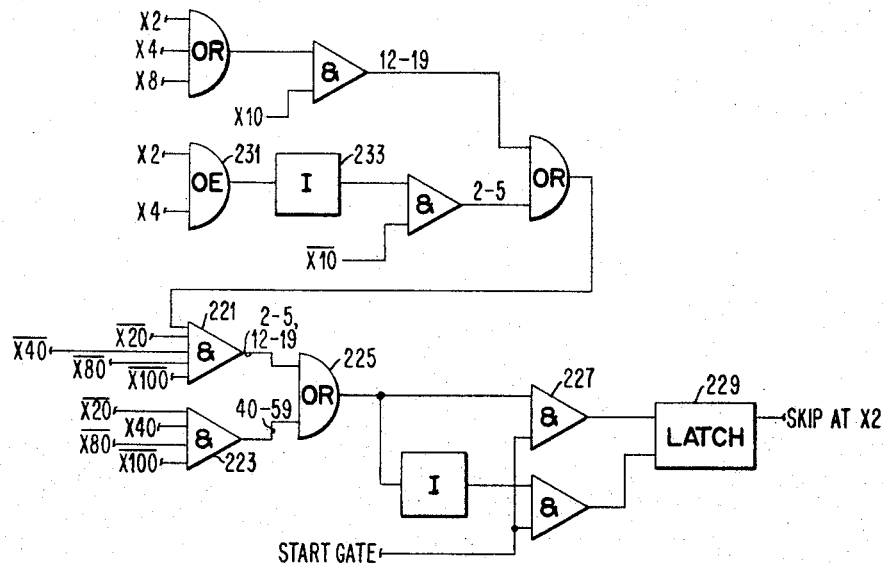
Figure 13:
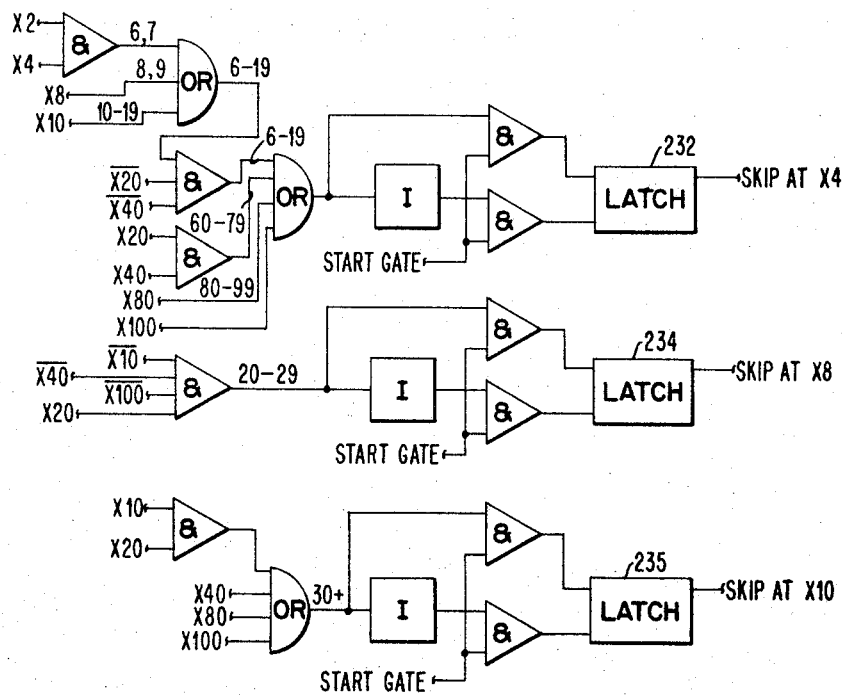
Figure 14:
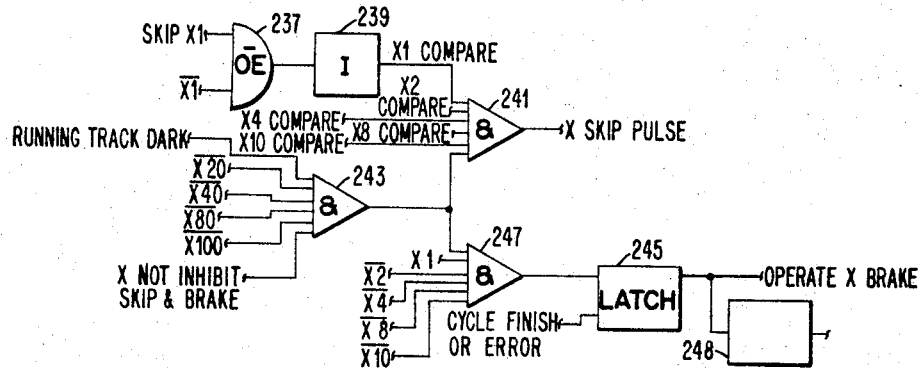
Figure 15:
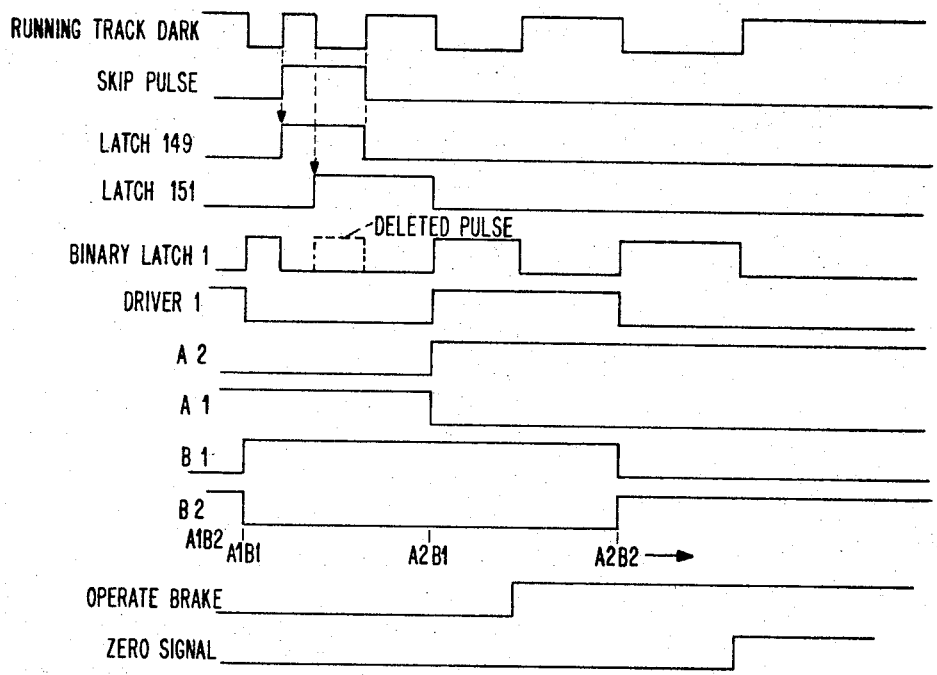
Figure 16:
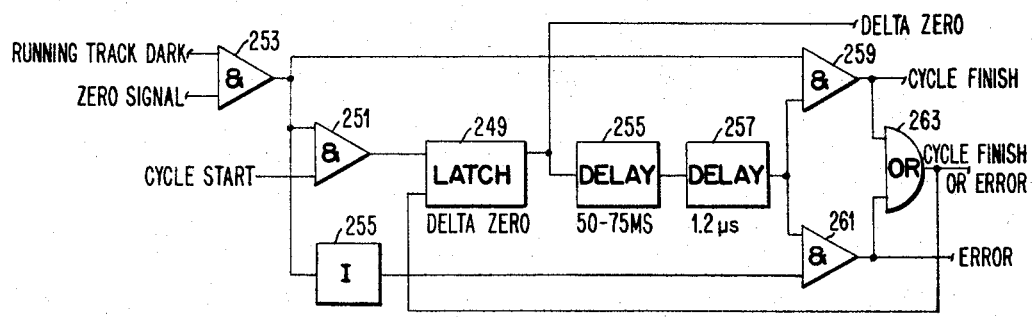
Figure 17:
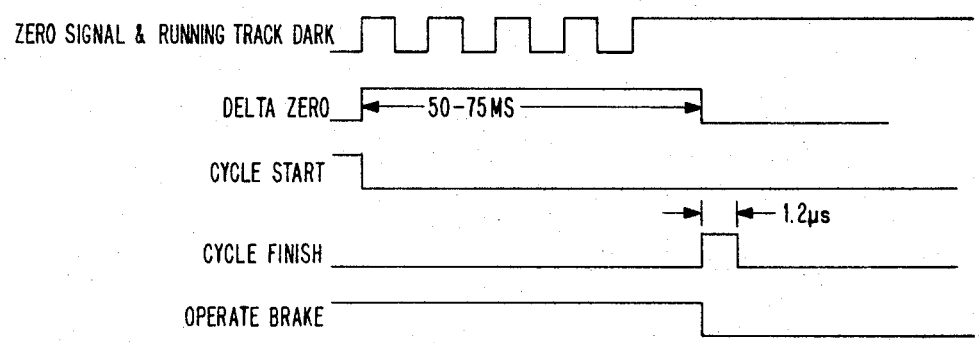
Figure 18:
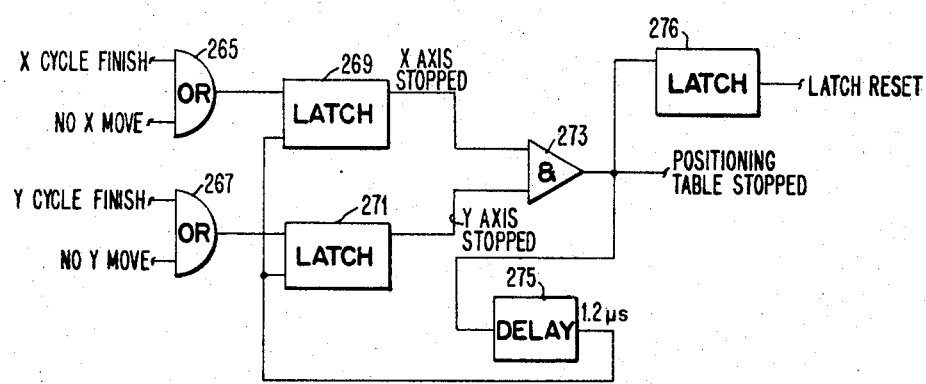
Figure 19:
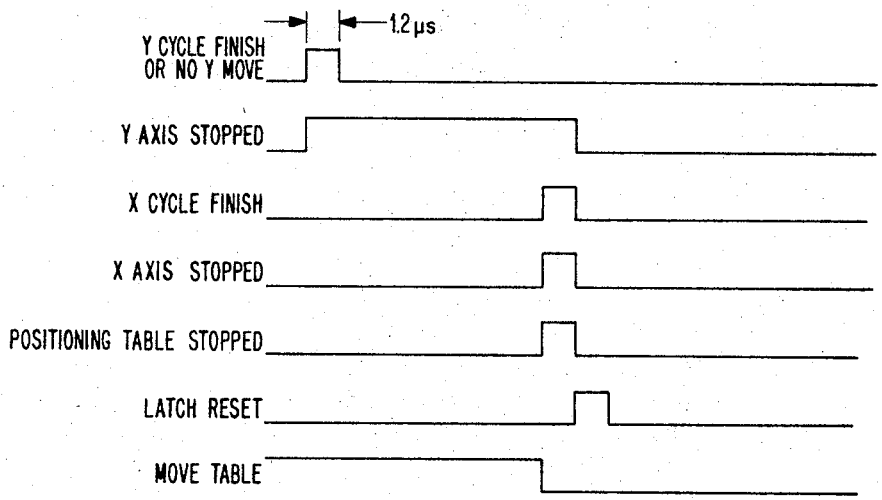
Figure 20:
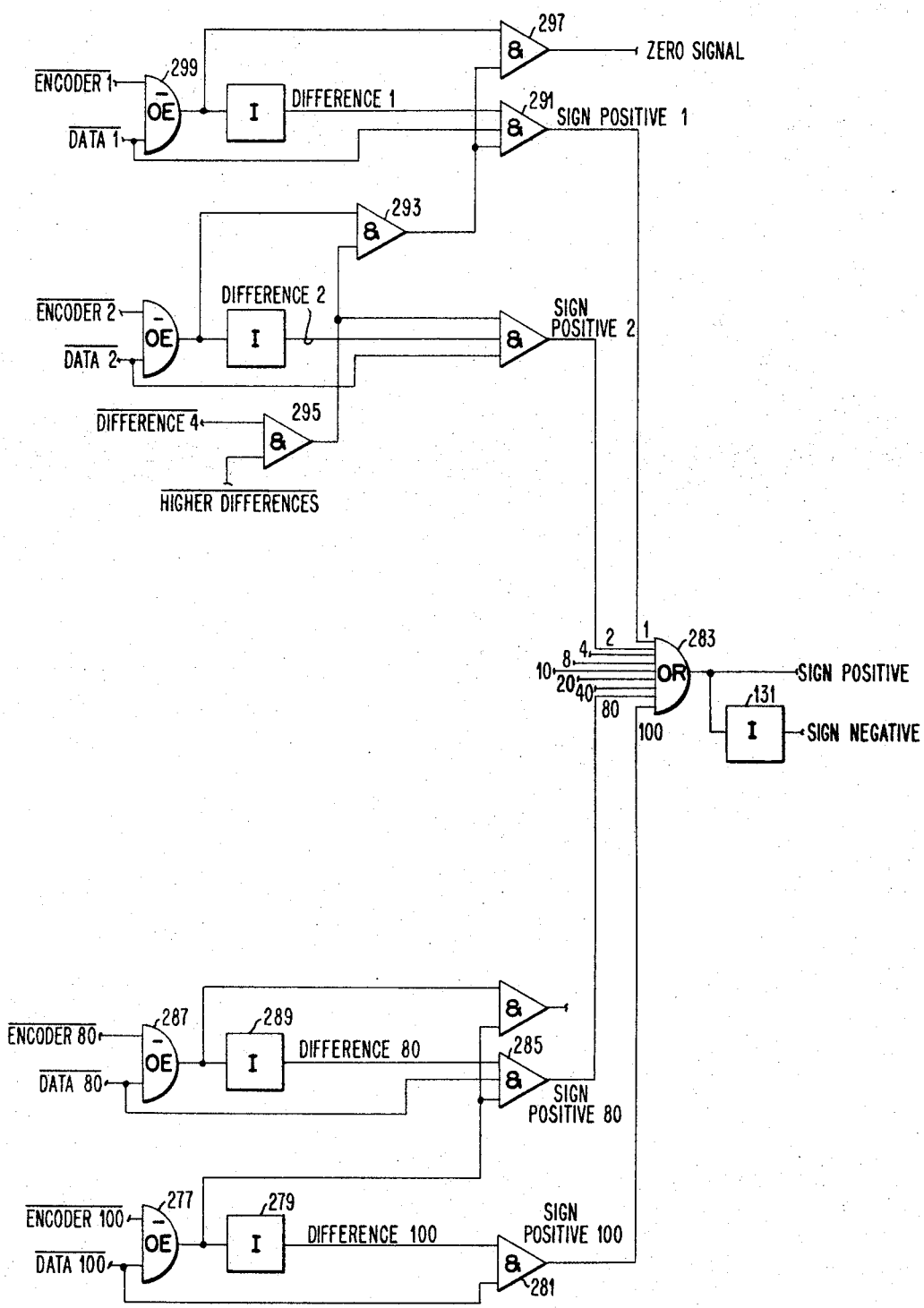
Figure 21:
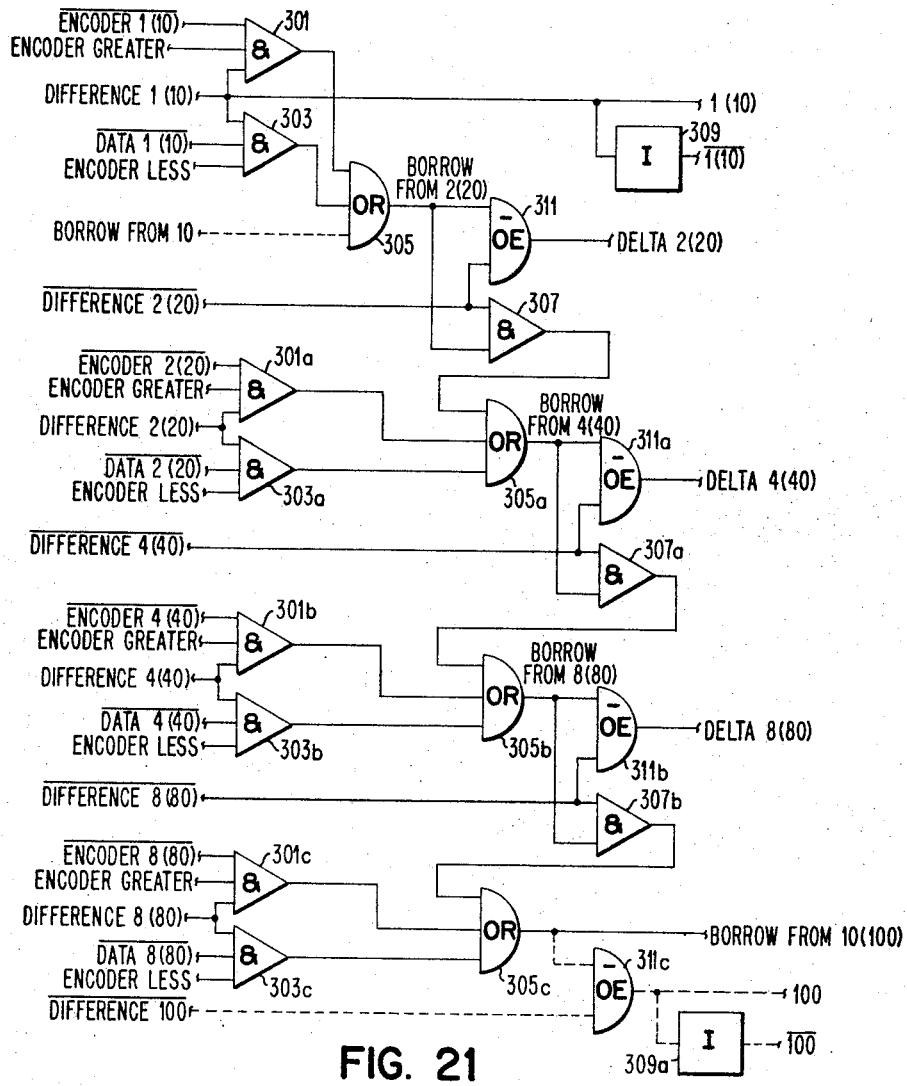
Figure 22:
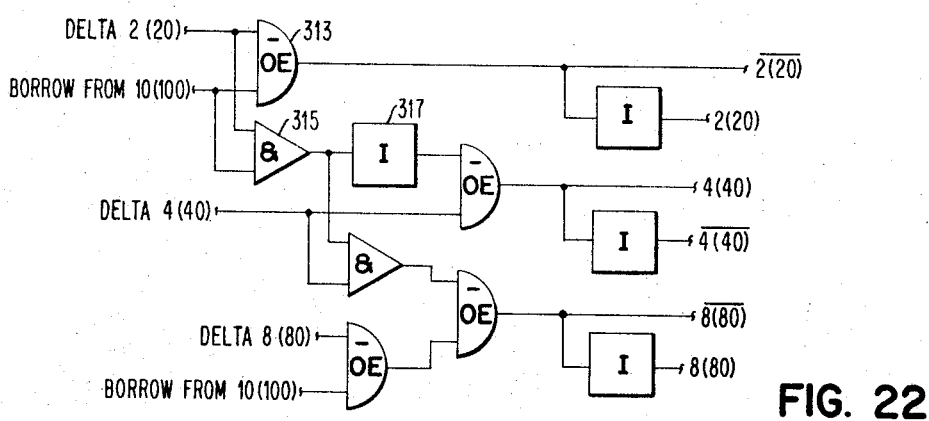

FIGS. 3(a) to 3(c) are simplified diagrams illustrating the stepping motor structure and operation;

FIG. 4 is a plan view of the optical encoder disc;

FIG. 5 is a block diagram useful in explaining basic features of the structure and operation of the stepping motor servo;

FIG. 6 is a schematic block circuit diagram of the starting logic;

FIG. 7 is a block diagram of the binary latch;

FIG. 8 is a block diagram of the stepping motor drive latches;

FIG. 9 is a timing diagram of the starting sequence;

FIG. 10 is a block diagram of the logic for the Skip Pulse latches;

FIGS. 11–13 are block diagrams of the logic for, respectively, Skip at X1, Skip at X2, and Skip at X4, X8, X19;

FIG. 14 is a block diagram of the logic for X Axis Skip and Brake Control;

FIG. 15 is a timing diagram for the stopping sequence;

FIGS. 16 and 17 are block diagrams and timing diagrams, respectively, for the Delta Zero Check logic;

FIGS. 18 and 19 are a block diagram and timing diagram, respectively, for the Positioning Table Stopped logic;

FIG. 20 is a block diagram of the logic for determining the sign of the difference between Encoder and Data (actual and desired position); and FIGS. 21 and 22 are block diagrams of the subtractor logic.

INTRODUCTION AND SUMMARY OF OPERATION

Figure 1:
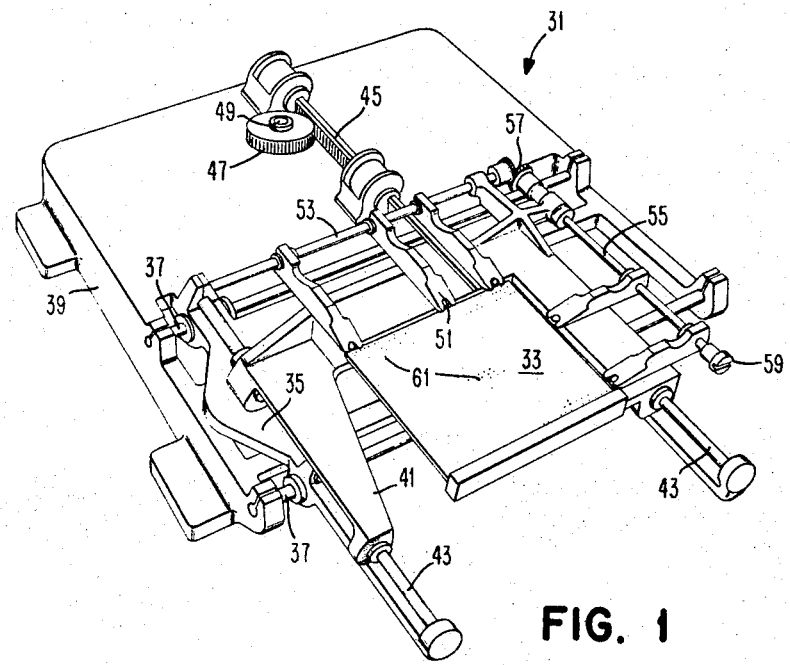
FIG. 1 is a perspective view of a two-axis positioning table employing stepping motor servos according to the invention, showing as a workpiece a printed circuit card having a matrix of through holes into which component leads can be inserted.

Referring to FIG. 1, the positioning table assembly 31 employs two stepping motor servos to drive a pair of orthogonally moving carriages for locating a workpiece such as printed circuit card 33 at the desired location, and is illustratory of a typical use of the stepping motor servo which is the subject of the invention. The X-axis carriage 35 is slidably mounted on a pair of spaced guide rails 37 on a base plate 39, and the Y-axis carriage 41 is bodily movable with the X-axis carriage by being slidable on a pair of spaced guide rails 43 supported on the X-axis carriage. The Y-axis carriage 41 is driven linearly by a rack 45 in mesh with a spur gear 47 fixed to one end of the shaft 49 of the stepping motor servo, which hangs below the table base plate 39. Although not here visible, the X-axis carriage 35 is driven by an identical gear and rack combination powered by the second stepping motor servo.

The printed circuit card 33, the workpiece, is clamped to the Y-axis carriage 41 along two adjacent edges only by sets of clamps 51 secured for rotation through about 90° to a pair of orthogonal shafts 53 and 55 supported on the Y-axis carriage 41 and geared together at 57 for common turning as drive coupling 59 is rotated. Ordinarily the printed circuit card 33 has a matrix of plated through holes 61, only some of which are shown here, at the intersections of all horizontal and vertical lines spaced 1/8 inch from one another, however other special hole patterns based on the standard 1/8" grid are possible. Furthermore, other sizes of cards 33 can be accommodated, such as a card approximately half the height of that shown, one which is half the width, or one which is both half the width and half the height. A typical use of the positioning table assembly 31 is to move the printed circuit card 33 beneath an inserting head (not here shown) for automatically inserting electrical components such as circuit modules, R-C packs, resistors or diodes onto the card with their leads extending through the plated through holes 61. In this case, the two stepping motor servos operate substantially simultaneously to move the card 33 sequentially to a series of desired X and Y positions under the fixed insertion head which makes insertion of components between moves. As used in the positioning table assembly 31, it will be observed that the X-axis servo draws a greater inertial load than the Y-axis servo, in view of the fact that the Y-axis carriage 41 is mounted for movement bodily with the X-axis carriage 35.

Figure 2:
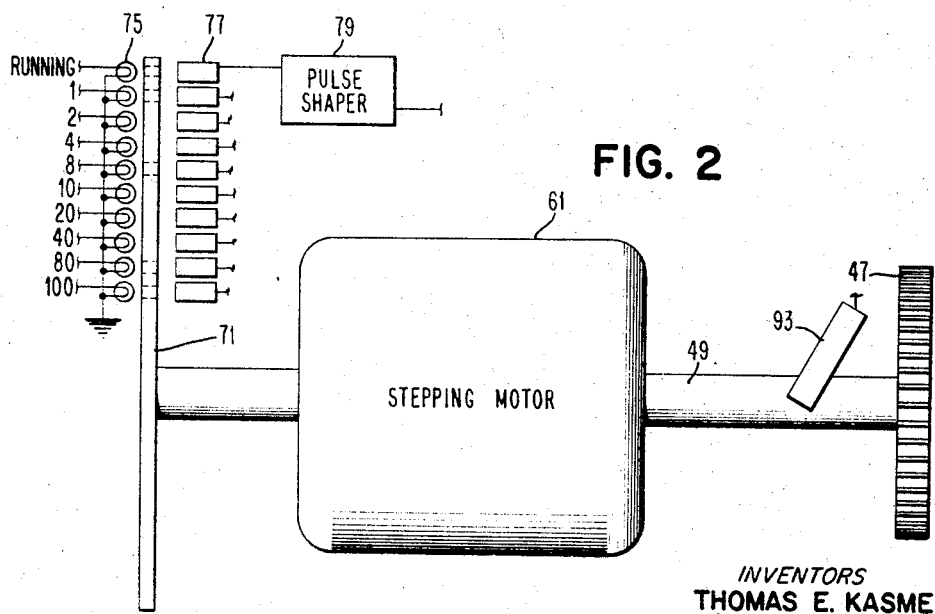
FIG. 2 is a schematic side view of the stepping motor and its attachments.

As was mentioned previously, the drive gear 47 is fixed to one end of the shaft 49 of the X-axis stepping motor 61 (FIG. 2). Although the Y-axis servo operates independently of the X-axis servo, the two servos are almost identical, and hereafter only the X-axis servo will be described and the slight differences in the Y-axis servo will be discussed at the appropriate point. Before proceeding further, the structure of the stepping motor 61 will be described. Referring to FIGS. 3(a) to (c) the rotor 63 has an axial permanent magnetic field and has a plurality of equally spaced teeth 65 at either end, the teeth at one end being angularly offset from those at the other end. The stator 67 has four distributed stator windings identified as A1, A2, B1 and B2 and also has a plurality of inwardly directed teeth 69. There are always fewer stator teeth than rotor teeth, and for simplicity of illustration, only five rotor teeth 65 and four stator teeth 69 are shown. Taken individually, the four stator windings would tend to produce the four magnetic field directions shown in FIG. 3(b), assuming that we are looking at the south pole of the stator, however one A and one B winding are always energized at the same time and their resultant field coincides with the stator teeth and produces stator poles, as shown in FIG. 3(c). The four steps of FIG. 3(c) represent a counterclockwise rotation of the stator field as viewed from the north pole end of the rotor. The windings are energized in the order A1B1, A1B2, A2B2, A2B1, and so on. As they are switched, the rotor turns just far enough to line up the nearest tooth with the new position of the south pole at a tooth on the stator. At the other or south pole end of the rotor, the nearest tooth lines up with the north pole tooth on the stator, since the rotor teeth are offset. At step 4, the rotor is in the same position as at step 0, except that the tooth (tooth 5) behind the index tooth (tooth 1) is lined up with the south pole of the stator. Thus the rotor moves the angular distance from tooth to tooth in four steps, and the number of steps in one shaft revolution is four steps times five teeth, or twenty steps. In the embodiment of the invention being described, the actual stepping motor 61 has 50 rotor teeth and 48 stator teeth and makes 200 steps in one shaft revolution, moving 1.8° in each step. A suitable commercially available motor is made by the Superior Electric Company and is identified as Superior Electric SS 250 Slo-Syn stepping motor.

Secured to the other end of the rotor shaft 49 (see FIGS. 2 and 4) is an encoder disc 71 having circularly arranged indicia corresponding to the number of steps of the stepping motor to provide self-generated commands to cause the motor to move step-by-step, and other indicia which give a unique digital representation of the actual angular position of the stepping motor (i.e. the rotor) for each of its steps. Encoder 71 is preferably an optical encoder having ten circular tracks of apertures or windows arranged along the radius of the disc. The outermost track has 200 of the apertures 73 equally spaced around the circumference corresponding to the 200 steps of the stepping motor. The device to detect the indicia comprises a light source 75 at one side of the disc and a phototransistor 77 or the like at the other side of the disc connected to a suitable pulse shaper circuit 79 for producing an output pulse whenever the apertures pass light as they rotate past the detection device. This is accordingly called the running or acceleration track since it produces the self-generated pulses which cause the stepping motor 61 to move step-by-step, one pulse for one step. Spaced along the same radius are nine other light sources 75 and phototransistors 77 for detecting the information on the other nine tracks of the encoder disc 71. These nine inner tracks give the actual position of the stepping motor shaft as step 0–199 in binary coded decimal (BCD) for m. The nine tracks from the outside to the inside track represent the decimal numbers 1, 2, 4, 8, 10, 20, 40, 80 and 100. The BCD number can be read and recorded from the inside outward by writing a 1 for each aperture or window 81 and a 0 for a dark space between windows along a radial line, for example, 11000 1001. To reduce this number to decimal form, from right to left, divide the BCD number into groups of four digits each (1/1000/1001). Each group encodes one digit of the decimal number in binary code; the decimal number is 189. Note also that the decimal number is the sum of the weighted values of all the bits where a 1 is found; thus 189 equals $$100+80+8+1$$

The information in inner tracks 2–10 describing angular position is unique provided the encoder disc 71 does not make a full revolution. Since the encoder is referenced to the linear location of one carriage of the positioning table 31 through the motor shaft 49 and rack and gear 45, 47, each unique combination of windows 81 in BCD code corresponds to a unique linear dimension on the table. Although such is not the case here, when the range of travel involved amounts to more than one revolution, a suitable vernier arrangement can be provided.

Having presented this introductory material, the basic features of the operation of the stepping motor servo system can be reviewed. The encoder disc 71 is angularly positioned on the rotor shaft 49 such that when the motor is locked on the step it lies between the windows 73 on the running track. Since the phototransistor 77 senses no light; it can be said that the running track is dark. It should be noted that at this time the inner tracks 2–10 do pass light to indicate the initial step position for the next move since the windows 73 lie between step positions. As the motor rotates from one step position to another, a window 73 passes light and an output pulse is generated. This pulse train is fed back into the motor. Let us assume that the motor is initially stationery. The running track is dark and the motor will receive no step command until a window sees light. The motor is at a stalemate since it cannot move until it receives a step command, and it cannot receive a step command until it moves. Thus a starting pulse exclusive of the encoder must be introduced in order to cause the motor to move, which action in turn will generate a second step command, and so on.

Referring to FIG. 5, to start the motor one pulse is fed into the motor drive circuit 81 by motor direction and start control 83. The stator field moves ahead one step. The rotor turns one-half step and passes one of the windows 73 and the running track feeds a pulse into the motor drive circuit, so that the field moves ahead one more step. Thus far the field has moved two steps, the rotor only one-half step; the field is therefore one and one-half steps ahead of the rotor. The action of encoder disc 71 is to switch the desired step position ahead of the actual step position by one and one-half steps. The one step lead of the field ahead of the rotor is due to the initial starting pulse, and the extra half step is introduced because the windows 73 switch light half-way between step positions. The rotor continually experiences a torque and this torque causes an acceleration and a resulting increase in rotor velocity until the time constants of the field windings cause the speed to level off asymptotically toward a maximum. That is, at a given rotor speed the rotor will move a certain angular distance beyond the step command position on the encoder disc 71 before a new field configuration is attained as a result of that step command. At progressively higher rotor speeds, the rotor will move progressively longer angular distances before encountering a new field configuration. There will be a rotor speed at which the rotor will move one and one-half steps before a new step is energized. At this speed the lead of the field ahead of the motor is reduced to zero. This causes the torque and resulting acceleration to become zero and the speed remains constant. The rate of increase of speed diminishes as the speed increases, resulting in an exponential increase of speed with time such as is observed in D.C. motors. The deceleration of the motor is exponential for the same reasons that the acceleration was exponential. This principle also can be used to decelerate the motor gradually from any arbitrary speed to any lower desired speed.

The desired step position in BCD code to which the motor is to be moved is derived from the working buffer 85 of a servo control unit 87 such as a computer. The control unit also includes a substractor 89. The desired step position from the working buffer 85 (hereafter called Data) provides one term in the subtractor 89 while the other term is the actual step position of the motor obtained from the inner tracks 2–10 of the shaft encoder 71 (hereafter called Encoder). At the start of any given move Encoder obviously is the step number in BCD of the stopped motor. The initial difference computed by the subtractor 89 is the total length of move in steps, and in addition the sign is computed, positive or negative, and sent to the motor direction and start control circuit 83 to indicate either a clockwise or counterclockwise rotation. As the move is made, subtractor 89 continuously computes the differenc between Encoder and Data. The motor must be directed to come to a stop at the correct step position, at which point the difference in the subtractor is zero.

In moving $n$ increments of step, the motor causes the encoder 71 to generate $n$ step commands or pulses. Since an extra starting pulse was added to initially start the motor, the motor will receive $n+1$ pulses in moving $n$ steps. So as not to position incorrectly by one step too much, one pulse must be subtracted from the encoder pulse train in order to move the correct amount. At the proper time, decleration and stop control circuits 91 suppress or skip one pulse, and the field stands still for a moment while the rotor keeps on going. When the pulse train resumes, the field is behind the rotor, following it and decelerating it rapidly to a low speed. Although there are other ways of dampening oscillations, in the preferred embodiment one step before the desired position, deceleration and stop control circuits 91 cause a charged capacitor circuit to apply a zero-backlash friction brake 93 (see also Fig. 2) to the motor shaft 49. The rotor at this point is turning slowly enough to stop at the next step, and it is seen that the total number of steps moved is equal to the number of pulses from the running track, since one extra pulse was added and one was suppressed.

The point at which the pulse should be suppressed or skipped can be worked out for any given application. For slow speeds, the deceleration characteristics of the motor are essentially equal to the acceleration characteristics. Since the distance to be moved is the area under the velocity curve, the area under the acceleration portion will approximately equal the area under the deceleration portion for small incremental moves. Hence, as the increment of move and the maximum velocity become small, the stopping distance approaches one-half the total distance. For long incremental moves where the speed levels off to a maximum, there will be a fixed stopping distance regardless of the length of the move. Thus, for all lengths of moves the stopping distance varies from one-half $n$ to some fixed value as the increment $n$ increases. In the positioning table assembly shown in FIG. 1, where the stepping motor for the X axis has a larger inertial load than that for the Y axis, the difference at skip pulse for the X axis will be greater than the difference at skip pulse for the Y axis. The following tables give the X axis and Y axis stopping distances for a particular positioning table system.

| Total Move Distance (Initial Difference) | Stopping Distance (Difference at Skip Pulse) | |
|---|---|---|
| | Decimal | BCD |
| X AXIS STOPPING DISTANCE | | |
| 1 step | 1 step | 00001 |
| 2-3 | 2 | 00010 |
| 4-5 | 3 | 00011 |
| 6-7 | 4 | 00100 |
| 8-11 | 5 | 00101 |
| 12-14 | 6 | 00110 |
| 15-19 | 7 | 00111 |
| 20-23 | 8 | 01000 |
| 24-29 | 9 | 01001 |
| 30-33 | 10 | 10000 |
| 34-39 | 11 | 10001 |
| 40-49 | 12 | 10010 |
| 50-59 | 13 | 10011 |
| 60-89 | 14 | 10100 |
| 100 or more | 15 | 10101 |
| Y AXIS STOPPING DISTANCE | | |
| 1 step | 1 | 0001 |
| 2-3 | 2 | 0010 |
| 4-6 | 3 | 0011 |
| 7-9 | 4 | 0100 |
| 10-19 | 5 | 0101 |
| 20-39 | 6 | 0110 |
| 40-49 | 7 | 0111 |
| 50 or more | 8 | 1000 |

Concerning inertial loads, this servo system can handle any inertial load since it must index physically one step before it gets a new step command. Thus it cannot get out of step regardless of the inertial load it must drive. Since it cannot get out of step, it cannot lose pulses and index incorrectly. The problem of moving $n$ increments reduces to metering $n$ pulses into the motor, rather than arbitrarily generating them as in a conventional system.

MOTOR DIRECTION AND START CONTROL

FIGS. 6, 7, and 8 and the timing diagram of FIG. 9 relate primarily to the sequence of events that starts the motor, and which also keeps it running until a skip pulse command is generated. In the logic circuit diagrams, well-known logic blocks are used such as AND, OR, and NOT circuits, latches and delay circuits, all of which operate in a conventional manner. For instance, AND circuit 95 produces an output only when all of its inputs are energized or are at an up voltage level. OR circuit 97 has an output or is up when any one or more than one of its inputs are energized. NOT or inverter circuit 99 has an output or is up when its input is down, and vice-versa. Latch 101 has set and reset inputs and produces an output only when it is set; latch 103 is a different type wherein one output is produced when it is set and another independent output is produced when it is reset. To the extent that further information is needed, the reader can refer to a standard text such as "Arithmetic Operations in Digital Computers" by R. K. Richards, Van Nostrand, New York, N.Y., 1955. The manner in which the various logic blocks and circuits are connected together will be obvious from the description of their operation.

Only the portion of the starting logic of FIG. 6 which is operative each and every time the motor starts will be explained at this time, and it will be assumed that the various check and special circumstance devices shown are not operative. These other devices will be explained at a later point. First of all, the working buffer 85 of the computer control unit 87 (FIG. 5) sends a Move Table order to motor direction and start control; it also feeds Data, or the desired position step number in BCD code, to the subtractor 89. Data is also fed to a table limit error circuit 107 which generates a Table Limit Error signal if the Data contains a forbidden bit combination or if Data orders a position outside of the permitted range of travel. A forbidden bit combination occurs when the desired step position does not lie between 0 and 199. The permitted range of travel on X and Y axes of the positioning table 31 is dependent upon the arrangement of holes 61 in the printed circuit card 33 (FIG. 1). In the present example, the physical parameters of the gear and rack 45, 47 are such that one step of the step motor corresponds to .025" of travel of the carriages 41 or 35. X-axis travel of the tables is limited to the range of steps 22 through 149, and Y-axis travel is limited to steps 23 through 124. Data which lies outside of these ranges is forbidden. With acceptable Data for both axes, either motor can be started.

Returning to FIG. 6, Not Table Limit Error and a Move Table signal from the working buffer 85 produce an output from AND circuit 95. This output and its inverted and delayed form produced by branching through NOT circuit 99 and 1.2 microsecond delay circuit 105 are inputs to AND circuit 109. A Table Move pulse is produced after the indicated short delay to allow time for Data to be entered into the subtractor 89 and the initial difference computed. As will be explained in further detail later, an X Zero signal is produced when the difference in the subtractor 89 is zero, indicating that the X-axis carriage 35 of the positioning table 31 has reached the desired position. When Table Move and X Zero Signal are both present, there is a No X Move output from AND circuit 111 since in this case there is to be no movement along that axis (presumably only along the other axis) and Encoder and Data are the same number. Assuming that there is to be a move and the initial difference is not zero (X Zero Signal is down), the output of inverter circuit 113 in a branch from X Zero signal is now up and there is an output from AND circuit 115 when Table Move appears. OR circuit 97 sets the cycle start latch 101 and Cycle Start appears. It is seen that for an X Zero Signal condition, the cycle start latch 101 cannot be set at this time.

The Cycle Start signal is applied directly as an input to AND circuit 117 and also as a second input through 100 microseconds delay circuit 119 and inverter 121. Start Gate is generated as the output of AND circuit 117 and lasts for 100 microseconds before going down. Cycle Start is also applied directly to AND circuit 123; the uninverted output of 100 microseconds delay circuit 110 provides a second input, and a third input comes through 200 microsecond delay circuit 125 and inverter 127. Consequently, Motor Start Pulse at the output of AND circuit 123 comes on after 100 microseconds when Start Gate goes down and lasts for 100 microseconds. A Sign Positive signal has already been generated by the subtractor 89, if the result of the subtraction is positive, and is applied to AND circuit 129 along with Start Gate to reset sign store latch 103. An output from reset indicates that Encoder is greater than Data and that a counterclockwise movement is to be made. If no Sign Positive signal appears, the sign is then negative and the output of inverter 131 and the Start Gate pulse energize AND circuit 133 and set the sign store latch 103. A set output indicates that Encoder is less than Data and that a clockwise movement of the stepping motor is to be made.

Before proceeding to the circuit which directly drives the stepping motor 61, the binary latch of FIG. 7 will be described. Latches 135 and 137, hereafter referred to as latches C and D, comprise a binary latch or frequency divider. The set and reset outputs of latch C produce respective outputs known as Driver 1 and Driver 0. Driver 1 and Driver 0 are also connected through AND circuits 139 and 141, respectively, to the set and reset inputs of latch D. These AND circuits have another input known as Binary Latch 0. The set and reset outputs of latch D are applied through AND circuits 143 and 145 to the set and reset inputs of latch C. Binary latch 1 is also an input to AND circuits 143 and 145. Binary Latch 1 follows the Motor Start Pulse and the Running Track Light pulse train up and down. This can be seen by referring to FIG. 10 wherein the Running Track Light pulse train is produced by pulse shaper circuit 79 (FIG. 2) when the phototransistors 77 sense light through the running track windows 73 in encoder disc 71. AND circuit 147 conducts when the running track light signal is up, there is a Cycle Start signal, and when latches 149 and 151 are reset, as they normally are. Binary Latch 1 appears at the output of OR circuit 153 whenever AND circuit 147 is energized, indicating that the running track is light, or at the very beginning of the move when Motor Start Pulse appears. Binary Latch 0 is simply Binary Latch 1 inverted by circuit 155. At the end of a completed move, a Reset signal (see FIGS. 18 and 19) is applied through OR circuit 157 (FIG. 7) to reset latch C. Latch D is also reset through application of this signal through OR circuit 159. Thus at the beginning of any move Driver 0 is up. The Motor Start Pulse produces a Binary Latch 1 (FIG. 10), which sets latch C through energized AND circuit 143. Driver 1 comes up and Driver 0 goes down. When Motor Start Pulse goes down, Binary Latch 0 appears and sets latch D through AND circuit 139. This does not change the Driver 1-Driver 0 output, however. The next Binary Latch 1 pulse makes AND circuit 145 conductive and resets latch C to produce Driver 0. It is seen that the Driver 1-Driver 0 output changes state once for each complete input command pulse. The motor 61 therefore steps once initially for Motor Start Pulse and thereafter once for each pulse from the running track as Running Track Light goes up and down. This is the timing shown in FIG. 9.

Referring to FIG. 8, the four motor windings are actually energized by latches 161 and 163, hereafter identified as latches A and B, having respective set and reset outputs of A2 and A1, and B2 and B1. When the latches are reset through respective OR circuits 165 and 167, A1 and B1 are up (motor windings A1 and B1 are energized). The two latches provide four outputs whose permutation is reversible, depending on whether the sign store latch 103 (FIG. 6) directs the motor to be driven clockwise (CW) or counterclockwise (CCW). The inputs of latches A and B are coupled to eight AND circuits 169 to 176, two for each input connected through the aforementioned OR circuits 165 and 167 and other OR circuits 177 and 179. For clockwise movement, latches A and B are driven through odd AND circuits 169, 171, 173 and 175; for counterclockwise movement the latches are driven through even AND circuits 170, 172, 174 and 176. Each of the AND circuits 169 to 176 has two other inputs, one being Driver 1 or Driver 0, the other being A1, A2, B1 or B2 as indicated on the drawing.

Consider a clockwise move and assume that all four latches, A, B, C and D are initially reset with Driver 0 up and Driver 1 down. With CW up, all three inputs to AND circuit 175 are up, and a reset signal is applied to latch B. Latch B is already in the reset condition, however, and this signal has no immediate effect. At least one input to each of the remaining AND circuits is down, and therefore the state of latches A and B remains unchanged for the moment. Motor Start Pulse causes Driver 1 to come up and Driver 0 to go down. The reset signal is removed from latch B and a set signal is applied to latch A through AND circuit 169. The energized windings are now A2, B1. When Driver 1 goes down and Driver 0 comes up again, latch B is set through AND circuit 173; the output is now A2, B2. One latch changes state each time the Driver 1-Driver 0 combination changes state. The clockwise permutation is A1B1, A2B1, A2B2, A1B2, A1B1, etc. The analysis for a counterclockwise move is the same, except that the permutation is reversed and is now A1B1, A1B2, A2B2, A2B1, A1B1, etc.

DECELERATION AND STOP CONTROL

The two things are required in the preferred embodiment in order to stop the motor. First, one pulse must be suppressed or deleted from the running track pulse train at the optimum step position before the desired position is reached as given in the table previously presented. Second, the motor 61 after decelerating by skipping a pulse is brought to a complete stop by energizing the shaft brake 93 one step before the desired position. The previously mentioned skip pulse latches 149 and 151, FIG. 10, remains reset throughout a move until the Skip Pulse signal comes up at the proper time in a manner to be explained later. Skip Pulse is applied to the set input of latch 149 through AND circuit 181 which has as other inputs the set output of latch 151 and a Running Track Dark signal derived from the pulse shaper circuit 79 in the device for detecting whether the windows 73 in encoder disc 71 are light or dark. Running Track Dark is also applied through AND circuit 183 along with the set output of latch 151, and further through OR circuit 185, to the reset input of latch 149. The set input of latch 151 is connected to AND circuit 187 having as inputs the Running Track Light signal and the set output of latch 149. The reset input of latch 151 is connected through OR circuit 189 to AND circuit 191, which has as inputs the Running Track Light signal and the reset output of latch 149. The Reset signal at the completion of any move is applied through the OR circuits 185 and 189 so that latches 149 and 151 remain reset throughout a move until a Skip Pulse signal comes up. The Skip Pulse signal when generated is coincident with Running Track Dark so that AND circuit 181 conducts and sets latch 149. The next Running Track Light pulse passes through AND circuit 187 and sets latch 151 but cannot get through AND circuit 147 (latch 149 is set) to bring up the Binary Latch 1 signal. Thus, a pulse is skipped and the motor drive latches A and B (FIG. 8) do not change state. At the next Running Track Dark time Skip Pulse no longer is present and latch 149 is reset through AND circuit 183. The next Running Track Light pulse is conducted through AND circuit 191 to reset latch 151, and is also now able to get through AND circuit 147 to produce a Binary Latch 1 pulse. It is seen that the net effect has been the removal of one pulse from the input to the motor drive circuit of FIG. 8. For a total move of one step, latch 151 remains set but is reset at the beginning of the next move by the first Running Track Light pulse.

The Skip Pulse signal is generated by the Skip Pulse logic shown (for the X axis) in FIGS. 11 to 14. The purpose of the Skip Pulse logic is to determine from the initial difference between Data and Encoder a BCD number representing the number of steps of stopping distance before the desired position is reached according to the table previously given. This stopping distance is stored in latches. The X axis requires five latches for the 1, 2, 4, 8 and 10 bits, while the Y axis requires only four latches for the 1, 2, 4, and 8 bits. Both the setting and resetting of these latches are gated by the Start Gate pulse (see FIG. 9) and their states are therefore determined from the initial difference before the motor starts to move.

The five bits that represent the X axis difference at Skip Pulse time are called Skip at X1, X2, X4, X8 and X10. X1, X2 and so on to X100 represent the BCD bits of the difference in subtractor 89 between Data and Encoder at any time. When difference bits X1 through X10 all compare with Skip at X1 through Skip at X10, the logic generates the Skip Pulse signal as will be further explained.

Skip at X1 is generated as shown in FIG. 11 for various initial differences whose corresponding stopping distances in BCD code require a 1 bit. The initial differences and stopping distances that require skip at X1 are as follows:

SKIP AT X1

| | Steps | | | | | | | |
|---|---|---|---|---|---|---|---|---|
| Initial Difference | 1 | 4–5 | 8–11 | 15–19 | 24–29 | 34–39 | 50–59 | 100+ |
| Stopping Distance | 1 | 3 | 5 | 7 | 9 | 11 | 13 | 15 |

It will be noted from the complete table of stopping distances that the odd stopping distances in decimal all have in their corresponding BCD form a 1 in the extreme right-hand (1 bit) column. To analyze the logic diagram it is necessary to consider the BCD forms of these initial differences. The AND circuit 193 at the top conducts whenever the initial difference in decimal is 15, 16 or 17 as indicated on the output line. This occurs when bits 4 and 10 are present and one or both of the 1 and 2 bit. Thus one input to AND circuit 193 is OR circuit 195 having X1 and X2 inputs. By a rule of Boolean algebra, the inverted output of $\overline{X4}$ and $\overline{X10}$ OR'ed together is the same as X4 and X10 AND'ed together. Thus $\overline{X4}$ and $\overline{X10}$ are inputs to OR circuit 197, the output being inverted by circuit 199. This provides the second input to AND circuit 193. AND circuit 201 conducts whenever the initial difference in decimal is 1, 4, 5, 8–11, 18, 19. To obtain this, $\overline{X2}$ is one input to the AND circuit, while the other input is $\overline{X4}$ or $\overline{X10}$, the output of OR circuit 197. When either of the AND circuits 193 and 201 conducts and passes through OR circuit 203, there is an input to AND circuit 205, the other inputs to which are $\overline{X20}$, $\overline{X40}$ and $\overline{X80}$. Thus, whenever the initial difference is one of 1, 4, 5, 8–11, or 15–19, there is an input to OR circuit 207. With this input or one of the other three inputs to OR circuit 207 conducting, when Start Gate appears, AND circuit 209 is energized to set latch 211 and produce a Skip at X1 signal.

In general the value forming any one of the inputs to the OR circuit 207 are determined by noting which bits are required (appear as inputs) which are forbidden (their NOT forms appear as inputs), and which are unspecified (do not appear as inputs). All possible values are obtained by taking the required bits with all possible combinations of the unspecified bits. The exception is the X100 bit, which is sufficient all by itself to set the latch, and it can be neglected where it is unspecified. Thus, AND circuit 213 having the inputs shown conducts when the initial difference in steps is 24–29 or 34–39. Similarly, AND circuit 215 is energized when the initial step difference is 50–59. If latch 211 is set it remains on throughout the entire move. The latch is reset at the start of the next move at the instant that Start Gate comes on by AND circuit 217 which has as its other input the down output of OR circuit 207 inverted by inverter 219.

Skip at X2 is produced by the logic of FIG. 12. The initial differences and stopping distances that require Skip at X2 are as follows (a 1 appears in the 2 bit column of the BCD form of the stopping distance):

SKIP AT X2

| | Steps | | | | | |
|---|---|---|---|---|---|---|
| Initial Difference | 2–3 | 4–5 | 12–14 | 15–19 | 40–49 | 50–59 |
| Stopping Distance | 2 | 3 | 6 | 7 | 12 | 13 |

This circuit basically includes an AND circuit 221 which conducts when the initial difference is 2–5, or 12–19, and another AND circuit 223 which conducts when the initial difference is 40–59. As before, these two circuits are inputs to OR circuit 225 and, when the Start Gate pulse appears, AND circuit 227 is energized to set latch 229 and produce a Skip at X2 signal. The latch 229 is reset as before. Circuit 231 labeled "OE" needs special comment. This circuit is different from the ordinary Exclusive OR circuit, which suggests that a difference in level at the two inputs causes an up level at the output, and that equal input levels (up or down) cause a down output. On the contrary, equal inputs to the OE circuit 231 produce an up output, both logically and in voltage level, and unequal inputs yield a down output. Thus it might be said that the OE circuit has a built-in logical inversion. The inverter 233 after OE circuit 231 cancels the built-in inversion; its output is up for X2 and $\overline{X4}$, or X4 and $\overline{X2}$. The remainder of the circuit of FIG. 12 will not be explained in view of the teaching provided by the explanation of FIG. 11.

Skip at X4, X8 and X10 are produced as shown in FIG. 13. The following initial differences and corresponding stopping distances are required as indicated:

|  | Skip at X4 | | Skip at X8 | Skip at X10 |
|---|---|---|---|---|
|  | | Steps | | |
| Initial Difference | 6–19 | 60–99 100+ | 20–29 | 30+ |
| Stopping Distance | 4–7 | 14 15 | 8–9 | 10–15 |

The logic and inputs required to set latch 232 to produce a Skip at X4 signal, latch 234 to produce a Skip at X8 signal, and latch 235 to produce a Skip at X10 signal are as shown in FIG. 13. These also will not be further explained.

Referring now to FIG. 14, the Skip at X1, X2, X4, X8 and X10 signals are compared with the X1, X2, X4, X8 and X10 difference bits in five $\overline{OE}$ circuits 237, only one of which is shown here. If Skip at X1 and $\overline{X1}$ are the same (up or down) the output of the $\overline{OE}$ circuit is up and that of the inverter 239 which follows it is down. The output of the inverter comes up, therefore, whenever the Skip at X1 and $\overline{X1}$ bits are the same. All five $\overline{OE}$ circuits are followed by inverters and operate in the same way. The five inverter outputs go to an 11 input AND circuit 241 whose other 6 inputs from another AND circuit 243 are $\overline{X20}$, $\overline{X40}$, $\overline{X80}$ and $\overline{X100}$ (the stopping distances in BCD code do not use these bits), Running Track Dark, and X Not Inhibit Skip and Brake. The latter (see FIG. 6) is the inverted output of AND circuit 117 which produces the Start Gate pulse. Consequently, X Not Inhibit Skip and Brake is up with the exception of the time that the Start Gate pulse is on. The output of the 11 input AND circuit 241 is the X Skip Pulse signal.

It will be recalled that the rotor shaft brake 93 (FIG. 2) is operated one step before the motor comes to a complete stop. In order to set latch 245 through AND circuit 247 to produce the Operate X Brake signal, X1 is AND'ed with the NOT forms of all other difference bits, Running Track Dark and X Not Inhibit Skip and Brake. Thus the output of AND circuit 243 serves as one of the inputs to the AND circuit 247. The brake 93 is energized by charged capacitor circuit 248 branched off of the set output of latch 245. As the motor 61 moves the one remaining step after the brake is energized, X1 goes down and the set signal is removed from latch 245. This latch is reset by X Cycle Finish Or Error which is generated as explained hereafter.

Some further explanation is needed as to X Not Inhibit Skip and Brake. As has been explained, this is simply the inverted form of X Start Gate. If it were not included as an input to both of the AND circuits 241 and 247, a one step move would be impossible. In this case, X Skip Pulse and Operate X Brake would come up during X Start Gate time, and before Motor Start Pulse time. With X Not Inhibit Skip and Brake included, Motor Start Pulse, X Skip Pulse and Operate X Brake all come up at approximately the same time when a one step move is made. The Operate X Brake signal is delayed slightly by the time through the latch and more so by the time constant of the brake solenoid winding. Motor Start Pulse starts the motor, X Skip Pulse suppresses the one pulse generated by the running track, and Operate X Brake comes up to stop the motor.

The Y axis skip pulse logic diagrams are not shown here, but of course are derived in the same manner as the X axis skip pulse logic. For the Y axis, only Skip at Y1, Y2, Y4 and Y8 are produced and stored in latches since, due to the lower inertia of the Y axis carriage 41, the maximum stopping distance is only 8 steps which can be expressed in BCD form with four bits.

Once the X Skip Pulse is produced by AND circuit 241, the stopping sequence is as shown in the timing diagram of FIG. 15. The skip pulse latches 149 and 151 (FIG. 10) delete one pulse from the running track pulse train as has been previously described. Consequently, Binary Latch 1 also has one pulse deleted and for this deleted pulse there is no change of state of the motor drive latches A and B (FIG. 8). The stator field changes position only three times while the rotor moves four steps. In this timing diagram, it is assumed that the motor is turning clockwise and that the required stopping distance is four steps ending at A2B2. The brake latch 245 is set and Operate X Brake comes up one step before the desired position, as soon as Running Track Dark comes up. As will be explained later (see FIG. 20) the X Zero Signal comes up when the desired position is reached indicating that the difference in the subtractor 89 is now zero.

CHECK AND ERROR CIRCUITS

For a given move it is conceivable that the rotor might slip or overshoot by one whole tooth and stop four steps before or after the correct position. Furthermore, the brake 93 is not strong enough to prevent a slight oscillation about the exact step, though the drag should damp out the oscillation gradually. The Delta Zero check circuitry of FIG. 16 (see also the timing diagram of FIG. 17) determines after a relatively long delay whether the stopping position is correct and whether the oscillation has been damped out properly. The X Delta Zero latch 249 has at its set input an AND circuit 251 for which one input is another AND circuit 253 conductive when Running Track Dark and X Zero Signal appear. Another input to the AND circuit 251 is the Cycle Start signal obtained from the cycle start latch 101 (FIG. 6) which is still on. The Delta Zero output signal from latch 249 resets this cycle start latch. Delta Zero is also fed through two delay circuits in series. The 50 to 75 millisecond delay provided in circuit 255 affects only the leading edge of the Delta Zero signal and is expected to allow enough time for oscillation of the rotor to die out. The 1.2 microsecond delay obtained in circuit 257 is insignificant by comparison. The delayed Delta Zero is connected to AND circuit 259 for which the other input is X Zero Signal and Running Track Dark. AND circuit 259 produces the Cycle Finish for the X axis.

At AND circuit 253, if Running Track Dark is down, then the rotor is still oscillating and the running track phototransistor 77 (FIG. 2) is picking up light on either side of the exact step position. If X Zero Signal is down, the rotor has stopped at the wrong step. In either case the output of the AND circuit 253 is down and its inverted output is up; this inverted signal produced by inverter 255 is an input to AND circuit 261 along with the delayed Delta Zero and produces an Error signal. Cycle Finish Or Error produced in OR circuit 263 resets the Delta Zero latch 249. The 1.2 microsecond delay affects the trailing edge of the Delta Zero signal as well as the leading edge; therefore the Cycle Finish, Error, and Cycle Finish Or Error signals are all 1.2 microsecond pulses. Cycle Finish Or Error also resets the brake latch 245 (FIG. 14). Thus, if Cycle Finish comes up the rotor is magnetically detented at the correct position and the brake 93 is no longer needed; if Error comes up, the brake must be released to restart the motor and correct the error. This is evident in FIG. 6 where the Error signal is passed through OR circuit 97 to set the cycle start latch 101, to initiate the various events of starting the motor again. The sign store latch 103 and those in the skip pulse logic (see FIGS. 11 to 13) remain in the same state as they are not reset until the next Start Gate time. When Cycle Finish comes up, the move is complete and correct for that axis.

The Y axis stepping motor, with its lighter inertial load, normally will complete its move first, unless the Y axis servo is making a rather long move while the X axis servo is making a short move or no move. Since the move must be complete on both axes before a component can be inserted into the printed circuit card 33 (FIG. 1) or other operation performed upon the workpiece, the Positioning Table Stopped pulse is generated and fed back to the working buffer 85 of the computer or control unit to indicate that the table is ready. The logic and timing are shown in FIGS. 18 and 19. The first Cycle Finish pulse on either axis to come up passes through OR circuit 265 or the other OR circuit 267 and sets latch 269 to produce an X Axis Stopped signal or the other latch 271 to produce a Y Axis Stopped signal. The last of the two cycle finish pulses sets the other latch. The latch 269 can also be set by No X Move which is generated (see FIG. 6) when there is movement only in the other direction. Similarly, No Y Move can set latch 271. The X Axis Stopped and Y Axis Stopped signals energize AND circuit 273 to produce a Positioning Table Stopped signal. After a 1.2 microsecond delay obtained in delay circuit 275, Positioning Table Stopped resets both of the latches 269 and 271 and goes down itself. As soon as Positioning Table Stopped comes up, the Move Table signal from the working buffer 85 (FIG. 5) goes down. Latch reset circuit 276 is operated when Positioning Table Stopped goes down and produces the Reset signal for resetting skip pulse latches 149 and 151 (FIG. 10), motor drive latches A and B (FIG. 8) and binary latches C and D (FIG. 7).

SUBTRACTOR

The subtractor 89 determines the sign and the difference between Data and Encoder, that is, between the desired position and the actual position, throughout the move. As was previously discussed, the sign is stored only at Start Gate time at the beginning of each move. The sign must be stored first so that the difference logic can subtract the smaller number from the larger one, rather than vice-versa. The difference is continuously computed at each discrete interval throughout the entire move until the difference is zero indicating that the desired position has been reached. The sign logic is shown in FIG. 20. The convention is adopted that the sign is positive when Encoder is greater than Data and the move is to be made made counterclockwise. When Encoder is less than Data the move is made clockwise and the sign is negative. In determining which number is larger, Data or Encoder, the determination involves locating the highest order bit where a difference occurs, and Encoder will be greater than Data, and hence the sign is positive, when Encoder in BCD form has a 1 and Data is a 0 at corresponding bit positions. As an example, 100000 is greater than 011111.

In general, corresponding Encoder and Data bits, or their NOT forms as is done here, are compared in nine —OE circuits only four of which are shown here. To analyze the sign logic, let us look first at the highest order bits, Encoder 100 and Data 100, to see if they are different and if the Data bit is a 0, in which case the sign is positive. Assuming that a 1 bit has an up level and a 0 bit has a down level, $\overline{\text{Encoder}}$ 100 and $\overline{\text{Data}}$ 100 are compared in —OE circuit 277, wherein there is an output if the input bits are the same, either both up or both down. An output therefore means that the input bits are the same or are not different. When there is a difference between the bits, the output of —OE circuit 277 is down and the output of the inverter 279 is up providing a Difference 100 signal. This is an input to AND circuit 281 as well as $\overline{\text{Data}}$ 100, which is up when this bit is a 0. With the presence of a Difference 100 and $\overline{\text{Data}}$ 100 being a 0, AND circuit 281 conducts indicating Sign Positive 100. Sign Positive 100 passes through OR circuit 283, which also conducts when there is a Sign Positive at any of the other lower order bits, and provides the Sign Positive signal. When Sign Positive is not present, the inverter 131 has a Sign Negative output.

The AND circuit 285 for producing Sign Positive 80 signal has an additional input. As before, $\overline{\text{Encoder}}$ 80 and $\overline{\text{Data}}$ 80 are compared in a —OE circuit 287, and when there is no output inverter 289 produces a Difference 80 signal. If $\overline{\text{Data}}$ 80 is a 0, the second input to AND circuit 285 is up. The third input comes from the output of the 100 bit OE compare circuit 277 which is at an up level when $\overline{\text{Encoder}}$ 100 and $\overline{\text{Data}}$ 100 are the same, and thus not different. It is seen that if Sign Positive 100 is produced, then Sign Positive 80 and the sign positive signal for any of the lower order bits cannot be produced. This can be verified by examining the logic circuit for $\overline{\text{Encoder}}$ 1 and $\overline{\text{Data}}$ 1. AND circuit 291 for producing the Sign Positive 1 signal has the usual inputs of Difference 1 and $\overline{\text{Data}}$ 1. The other input is from AND circuit 293 which is at an output up level when $\overline{\text{Encoder}}$ 2 and $\overline{\text{Data}}$ 2 are the same and when $\overline{\text{Difference}}$ 4 (i.e., $\overline{\text{Encoder}}$ 4 and $\overline{\text{Data}}$ 4 are the same) and other $\overline{\text{Higher Differences}}$ for the other bits occur so that AND circuit 295 conducts. The remainder of FIG. 20 is obvious and will not be explained with the exception of AND circuit 297 for producing the Zero Signal. The Zero Signal occurs when the difference in the subtractor is zero, indicating that the desired position has been reached. The difference is zero when the corresponding bits of Encoder and Data are the same. The output of $\overline{\text{OE}}$ circuit 299 occurs when $\overline{\text{Encoder}}$ 1 and $\overline{\text{Data}}$ 1 are the same, and there is an output from AND circuit 293 when $\overline{\text{Encoder}}$ 2 and $\overline{\text{Data}}$ 2 are the same and all other higher order bits are the same (AND circuit 295). Thus these are the inputs to AND circuit 297.

The operation of the difference logic for determining continuously the difference between Encoder and Data (see FIGS. 21 and 22) can be described functionally as treating Encoder and Data as straight binary numbers, subtracting the smaller from the larger by binary rules, and then adding a constant to the binary difference, if necessary, to obtain the final BCD difference. Correction is required whenever it is necessary to borrow from the 10 bit, which would be a 16 bit in binary code, or from the 100 bit, which would be a 256 bit in binary code. For example, suppose that for a given move Encoder is 20 (000100000 in BCD) and Data is 2 (000000010). Then Encoder is greater and Data must be subtracted from it; the Difference is obviously 18, but subtraction by binary rules will give an answer of 30 in binary or 24 in BCD (000011110). A correction is needed. The rule is evolved that for any two numbers under 100, whenever a borrow from the 10 bit is required, a binary 10 (001010) is added to the binary difference. A straight binary subtraction will give the correct answer whenever the borrow is not required. When the two numbers are over 100, whenever a borrow from the 100 bit is required, the binary number to be added to the binary difference to make the correction is 160 (010100000). Since the ones have weighted values of 80 and 20 in BCD, the logic can be called the Add-100 Logic, though the number is not a proper representation of 100 in either system. If the four zeros on the right are omitted, the procedure can be seen to be the same as the add 10 procedure, the logic for this being called the Add-10 Logic.

The difference logic can be divided into four sections: (1) The Binary difference logic from the 1 bit through the 10 bit; (2) the binary difference logic from the 10 bit through the 100 bit; (3) the Add-10 Logic; and (4) the Add-100 Logic. FIG. 21 shows sections (1) and (2) which are identical except that section (2) has the additional circuitry shown in broken lines. Bits 10 through 80 are also shown in parentheses. FIG. 22 shows sections (3) and (4) which are entirely identical, bits 20 through 100 being shown in parentheses.

At each bit level (FIG. 21) $\overline{\text{Encoder}}$, Encoder Greater and Difference are AND'ed together in AND circuits 301 to 301c. $\overline{\text{Data}}$, Encoder Less and Difference are also AND'ed together in AND circuits 303 to 303c. The outputs of the two AND circuits 301 and 303 at each level are OR'ed together in circuits 305 to 305c to form a Borrow signal, since in each case if the output of the AND circuit is up the smaller number has a 1 that must be subtracted from a 0 at that level, requiring a borrow. At each bit level above the 1 bit the OR circuit 305a to 305c has a third input comprising the $\overline{\text{Difference}}$ signal at that level AND'ed in AND circuit 307 with the Borrow signal from the next lower level. An up level on this line indicates that the lower level requires a borrow bit but must go beyond the next higher level to find a one from which to borrow. This is the same as saying that the higher level must borrow from the still higher level according to a progressive borrowing scheme.

The 1, 10 and 100 bits of the binary difference are also those of the BCD difference, since their values will not be affected by the Add-10 or Add-100 logic and are not inputs to this logic. Difference 1 (or 10) provides the 1 (or 10) bit, and inverter 309 produces the corresponding $\overline{1}$ (or $\overline{10}$) bit. To obtain the 100 bit in the difference, $\overline{\text{Difference 100}}$ is compared in —OE circuit 311c with the borrow from 10 (100). When both are either up or down, there is an output. In similar fashion, Delta 2 (20), Delta 4 (40) and Delta 8 (80) are produced in —OE circuits 311 to 311b by comparing the Borrow at one level with the $\overline{\text{Difference}}$ from the next higher level. These are up for a 1 on each corresponding level of the binary difference, or down for a 0 at each level. They are the bits affected by the Add-10 or Add-100 logic.

The Add-10 or Add-100 logic is made up of —OE circuits 313, AND circuits 315 and inverters 317 connected together as shown to carry out the logic shown in the following table:

RESULTS OF ADD-TEN LOGIC

| Borrow From 10 | Binary Difference | | | BCD Difference | | |
|---|---|---|---|---|---|---|
| | DELTA 8 | DELTA 4 | DELTA 2 | 8 | 4 | 2 |
| 0 | 0 | 0 | 0 | 0 | 0 | 0 |
| 0 | 0 | 0 | 1 | 0 | 0 | 1 |
| 0 | 0 | 1 | 0 | 0 | 1 | 0 |
| 0 | 0 | 1 | 1 | 0 | 1 | 1 |
| 0 | 1 | 0 | 0 | 1 | 0 | 0 |
| 0 | 1 | 0 | 1 | Forbidden | | |
| 0 | 1 | 1 | 0 | | | |
| 0 | 1 | 1 | 1 | | | |
| 1 | 0 | 0 | 0 | | | |
| 1 | 0 | 0 | 1 | | | |
| 1 | 0 | 1 | 0 | | | |
| 1 | 0 | 1 | 1 | 0 | 0 | 0 |
| 1 | 1 | 0 | 0 | 0 | 0 | 1 |
| 1 | 1 | 0 | 1 | 0 | 1 | 0 |
| 1 | 1 | 1 | 0 | 0 | 1 | 1 |
| 1 | 1 | 1 | 1 | 1 | 0 | 0 |

Certain combinations in the binary difference are forbidden because they imply forbidden bit combinations in the original BCD numbers. If the Borrow from 10 line is down (i.e. is 0), the bits of the BCD difference have the same values of those of the binary difference. When the Borrow from 10 line is up (i.e., is 1), the results shown in the table can be checked by adding binary 10 to the binary difference and dropping the carry from the 8 bit to the 16 bit. With a knowledge of the operation of the —OE circuit, the logic can be shown to give the results tabulated. In this manner the subtractor difference bits 2 (20), 4 (40) and 8 (80), together with their NOT forms are obtained.

CONCLUSION

The operation of the stepping motor servo system according to the invention will not be reviewed in view of the description given previously in the introduction and summary of operation. Some mention will be made, however, by way of review of various distinctive features of the invention.

The optical encoder disc 71 secured to the motor shaft 49 generates the pulse input into the stepping motor 61, with the exception of the first starting pulse. To do this, the encoder 71 has an outermost running track having the same number of windows 73 as the motor has increments. Hence the motor must move physically before it can receive subsequent move commands. This mechanical synchronization results in a system which cannot lose step commands, being self-generated, and enables the motor to drive any inertial load with characteristics similar to those of a D.C. series-wound motor. The encoder contains nine other tracks in addition to the running track required for step command generation. These nine tracks are coded in BCD and exhibit a unique combination corresponding to each of th emotor increments or steps. They provide a stable digital indication of motor shaft angular orientation. The BCD subtractor 89 accepts data from a computer or other similar control unit 87 giving the desired position to be moved to, and encoder input directly in BCD code without regard for the greater and lesser of the two, and computes both their difference in BCD code and their sign or inequality. This sign indicates the direction in which the motor must rotate so as to diminish the difference between the two numbers representing desired and actual positions.

The system does not utilize a continuous feedback in order to effect an incremental move, but rotates the motor blindly in the initial indicated direction until such time that the data and encoder BCD numbers compare bit by bit. The motor is brought to a stop by virtue of its incremental characteristics. The linear movement of the positioning tables 35 and 41 is incidental to the system since there is no feedback from the table in any form. The system is basically a rotary positioning device. The motor is caused to accelerate exponentially by the addition of at least one extra pulse exclusive of the running track on the encoder 71 and is caused to decelerate exponentially as a result of removing at least one pulse by means of logic. With these techniques, the motor can be accelerated to speeds much in excess of the manufacturer's ratings and can be decelerated and stopped safely with characteristics similar to those of a D.C. servo system. Over voltaging the motor windings to reduce the effects of the $L/R$ time constant is done. This enables the stepping motors to run at a much higher speed.

While the invention has been particularly shown and described with reference to a preferred embodiment thereof, it will be understood by those skilled in the art that various changes in form and details may be made therein without departing from the spirit and scope of the invention.

What is claimed is:

1. A computer-controlled stepping motor servo comprising
   a stepping motor including a fixed member and a rotatable member movable by incremental steps upon the application of commands to the motor, one step per command, said motor being movable between initial and desired step positions, encoder means having a running track of equally spaced indicia corresponding in number to the number of steps of said motor and other indicia giving a unique representation of the actual angular position of the rotatable member for each of its steps, means for detecting said indicia as said rotatable member moves, and for generating a command corresponding to each of the running track indicia which are detected, means for providing a start command to the motor, means for supplying a representation of the desired step position to which the motor is to be moved, and means for computing the difference in steps between the initial and desired step positions and for driving the motor a number of steps equal to this computed difference less one step which is skipped to account for the extra step introduced by the start command, the command corresponding to said skipped step being skipped at a predetermined distance in steps before the desired step position to cause the motor to decelerate.

2. A construction as defined in claim 1 further including means for determining the sign of the computed difference between the initial and desired step positions before the start command is provided so that the motor is driven clockwise or counterclockwise depending on whether the sign is negative or positive.

3. A computer-controlled stepping motor movable between an initial step position and a desired step position comprising a stepping motor including a fixed member and a rotatable member movable by incremental steps upon the application of commands to the motor, one step per command, encoder means having a running track of equally spaced discrete indicia corresponding in number to the number of steps of said motor and other indicia giving a unique digital representation of the actual angular position of the rotatable member for each of its steps, means for detecting said indicia as said rotatable member moves, and for generating a command corresponding to each of said running track indicia which are detected, means for providing a start command, and for causing movement of said motor step by step in response to the start command and thereafter in response to the generated commands, means for supplying a digital representation of the desired step position to which the motor is to be moved, and for continuously computing the difference in steps between the desired position and the actual step position detected on said encoder means, and means for skipping a command when the computed difference is a predetermined number of steps before the desired position dependent upon the initial difference between the initial and desired positions, to cause said motor to decelerate.

4. A construction as defined in claim 3 further including brake means for said rotatable member for bringing the motor to a complete stop, and means for operating said brake means at a selected step before the desired step position is reached.

5. A construction as defined in claim 3 further including means for generating a signal when the computed difference is zero to indicate that the desired step position has been reached.

6. A computer-controlled stepping motor servo movable between an initial step position and a desired step position comprising a stepping motor including a fixed member and a rotatable member movable by incremental steps upon the application of pulses thereto, one step per pulse, optical encoder means secured to said rotatable member and having a running track of equally spaced apertures corresponding in number to the number of steps of said motor and other tracks of apertures giving a unique digital representation of the actual angular position of the movable member for each of its steps, means for detecting said apertures as said rotatable member moves, and for generating a pulse corresponding to each of the running track apertures which are detected, means for producing a start pulse, and causing rotation of the motor step by step in response to the start pulse and thereafter in response to the generated pulses, so that the rotatable member experiences a torque and is accelerated, means for supplying a digital representation of the desired step position to which the motor is to be moved, and for continuously computing the difference in steps between the desired step position and the actual step position detected on said encoder means, means for determining a stopping distance in steps dependent upon the initial difference between the initial and desired step positions, and means for skipping a pulse when the computed difference compares to the stopping distance to cause said motor to decelerate.

7. A construction as defined in claim 6 further including brake means for dampening out oscillations about the desired step position, means for generating a zero signal when the computed difference is zero for indicating that the motor has reached the desired step position, and means for generating a cycle finish signal delayed after the zero signal for checking whether the motor is truly at the desired step position.

8. A construction as defined in claim 6 further including a linearly adjustable positioning table driven by said stepping motor, and means for converting rotary motion to linear motion for coupling said rotatable motor member and positioning table.

9. A computer-controlled stepping motor servo comprising a stepping motor including a stator having a rotatable magnetic field and a rotor movable by incremental steps upon the application of pulses to the motor, one step per pulse, said motor being movable between initial and desired step positions, an optical encoder secured to said rotor and having a running track of equally spaced apertures corresponding in number to the number of steps of said motor and other tracks of apertures giving a unique digital representation of the actual angular position of the rotor for each of its steps, means for detecting said apertures as said rotor and encoder move, and for generating a pulse corresponding to each of the running track apertures which are detected, means for producing a start pulse, motor drive means for causing the magnetic field of the stator to rotate by increments initially when said start pulse is introduced and thereafter when the generated pulses are introduced, whereby the stator field leads and accelerates the rotor, means for supplying a digital representation of the desired step position to which the motor is to be moved and for continuously computing the difference in steps between the desired step position and actual step position detected on said encoder, means for determining the digital representation of an optimum stopping distance in steps before the desired step position dependent upon the initial difference between the initial and desired step positions, means for skipping a pulse when the computed difference compares to the stopping distance, to cause said motor to decelerate, and brake means applied one step before the desired step is reached for stopping the rotor at the desired step position.

10. A construction as defined in claim 9 wherein the initial difference and the sign of the initial difference are computed before the start pulse is produced, and means for conditioning said motor drive means according to the sign to drive the motor clockwise or counterclockwise.

11. A construction as defined in claim 9 wherein said means for determining an optimum stopping distance comprises logic for setting a latch for each of the bits of the stopping distance in steps, and means for comparing the output of the latches bit by bit with the computed difference for producing a skip pulse signal to serve as an input to the means for skipping a pulse.

12. In a positioning table for workpieces, the combination of a table and a stepping motor servo coupled thereto for adjusting the table to a unique position corresponding to each of the steps of the motor, said servo including a stepping motor having a fixed member and a rotatable member movable by incremental steps upon the application of commands to the motor, one step per command, said motor being movable between initial and desired step positions, encoder means having a running track of equally spaced indicia corresponding in number to the number of steps of said motor and other indicia giving a unique digital representation of the actual angular position of the rotatable motor for each of its steps, means for detecting said indicia as said rotatable member moves, and for generating a command corresponding to each of the running track indicia which are detected, means for providing a start command to the motor, means for supplying a digital representation of the desired step position to which the motor is to be moved, and means for computing the difference in steps between the initial and desired step positions, and for driving the motor a number of steps equal to this computed difference less one step which is skipped to account for the extra step introduced by said start command, the command corresponding to said skipped step being skipped at a predetermined difference in steps before the desired step position depending on the difference between the initial and desired step positions, to cause the motor to decelerate and be brought to a stop at the desired step position.

13. In a positioning table for workpieces, the combination of a linearly movable carriage and a stepping motor servo for adjusting the carriage to a unique position corresponding to each of the steps of the motor, said servo including a stepping motor having a stator and a rotor movable by incremental steps upon the application of pulses to the motor, one step per pulse, there being means for coupling the rotor and carriage for converting rotary movement into linear movement as the motor moves between initial and desired step positions, an encoder secured for rotation with said rotor and having a running track of equally spaced discrete indicia corresponding in number to the number of steps of said motor and other indicia giving a unique representation of the actual angular position of the rotor for each of its steps, means for detecting said indicia as said rotor and encoder means move, and for generating a pulse corresponding to each of the running track indicia which are detected, means for producing a start pulse, means for driving the motor step by step in response to the start pulse and thereafter in response to the generated pulses, to cause the motor to accelerate, means for supplying a representation of the desired step position to which the motor is to be moved, and for continuously computing the difference in steps between the desired position and the actual step position detected on said encoder, and means for skipping a pulse when the computed difference compares to the representation of a predetermined stopping distance in steps before the desired position dependent upon the initial difference between the initial and desired positions, to cause the motor to decelerate, the computed difference between actual and desired positions being zero when the desired position is reached.

14. In a positioning table for workpieces, the combination of a linearly movable carriage and a stepping motor servo for adjusting the carriage to a unique position corresponding to each of the steps of the motor, said servo including a stepping motor having a rotatable magnetic field and a rotor movable by incremental steps upon the application of pulses to the motor, one step per pulse, there being a rack and gear for coupling the rotor and carriage as the motor moves between initial and desired step positions, an optical encoder secured to said rotor and having a running track of equally spaced apertures corresponding to the number of steps of said motor and other tracks of apertures detectable between said running track apertures for giving a unique digital representation of the actual angular position of the rotor for each of its steps, radially arranged means for detecting said apertures as said rotor and encoder move, and for generating a pulse corresponding to each of the running track apertures which are detected, means for producing a start pulse, motor drive means for causing the magnetic field of the stator to rotate by increments initially when said start pulse is introduced and thereafter when the generated pulses are introduced, whereby the stator field leads and accelerates the rotor exponentially to maximum running speed, means for supplying a digital representation of the desired step position to which the motor is to be moved, means for continuously computing the difference in steps between the desired step position and actual step position detected on said encoder, means for determining before the start pulse is introduced the digital representation of a stopping distance in steps before the desired step position dependent on the initial difference between the initial and desired step positions, means for skipping a pulse when the computed difference compares to the stopping distance, to cause the motor to decelerate, and brake means applied before the desired step position is reached to dampen oscillations and bring said motor to a stop at the desired step position.

References Cited

UNITED STATES PATENTS

| | | | |
|---|---|---|---|
| 2,792,545 | 5/1957 | Kamm | 318—162 XR |
| 3,304,480 | 2/1967 | Ko | 318—138 |
| 3,339,122 | 8/1967 | Sangster | 318—18 |
| 3,345,547 | 10/1967 | Dunne | 318—138 |

BENJAMIN DOBECK, *Primary Examiner.*